(12) United States Patent
Vanscoyk et al.

(10) Patent No.: US 10,849,175 B2
(45) Date of Patent: Nov. 24, 2020

(54) USER-DEFINED DEVICE CONNECTION MANAGEMENT

(71) Applicant: AT&T Intellectual Property I, L.P., Atlanta, GA (US)

(72) Inventors: Evan Vanscoyk, Collinsville, IL (US); Avery Spencer, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 87 days.

(21) Appl. No.: 14/935,764

(22) Filed: Nov. 9, 2015

(65) Prior Publication Data

US 2017/0135113 A1 May 11, 2017

(51) Int. Cl.
| | | |
|---|---|---|
| *H04W 76/11* | (2018.01) | |
| *H04W 4/02* | (2018.01) | |
| *H04M 1/725* | (2006.01) | |
| *H04W 48/18* | (2009.01) | |
| *H04W 76/30* | (2018.01) | |

(52) U.S. Cl.
CPC ....... *H04W 76/11* (2018.02); *H04M 1/72563* (2013.01); *H04W 4/025* (2013.01); *H04W 48/18* (2013.01); *H04W 76/30* (2018.02)

(58) Field of Classification Search
CPC .............. H04W 72/0493; H04W 4/025; H04W 76/021; H04M 1/72563
USPC .................................................. 455/418–420
See application file for complete search history.

(56) References Cited

U.S. PATENT DOCUMENTS

| | | |
|---|---|---|
| 6,104,913 A | 8/2000 | McAllister |
| 6,754,504 B1 | 6/2004 | Reed |
| 6,973,335 B2 | 12/2005 | Ganton |
| 7,403,744 B2 | 7/2008 | Bridgelall |
| 7,590,101 B2 | 9/2009 | Forand et al. |
| 7,630,323 B2 | 12/2009 | Bridgelall |
| 7,706,282 B2 | 4/2010 | Huang |
| 8,935,408 B2 | 1/2015 | Pasko et al. |
| 2003/0204582 A1 | 10/2003 | Shimoda et al. |
| 2005/0096753 A1* | 5/2005 | Arling .................... G05B 15/02 700/11 |

(Continued)

FOREIGN PATENT DOCUMENTS

| | | | | |
|---|---|---|---|---|
| WO | WO2004031488 A1 * | 4/2004 | ......... | H04L 12/5692 |
| WO | WO 2015054501 | 4/2015 | | |

OTHER PUBLICATIONS

Crawford, Stephanie. "How Apple AirPlay Works." How Stuff Works. https://electronics.howstuffworks.com/airplay.htm. Internet Archive https://web.archive.org/web/20120206074244/http://electronics.howstuffworks.com/airplay2.htm. Archived Feb. 6, 2012. Accessed Aug. 30, 2019. (Year: 2012).*

(Continued)

*Primary Examiner* — Erica Navar
(74) *Attorney, Agent, or Firm* — Hartman & Citrin LLC

(57) ABSTRACT

Concepts and technologies are disclosed herein for user-defined device connection management. A connection-based rule can be defined. The connection-based rule can include a connection-based condition and an action to be taken when the connection-based condition is detected. Application of the connection-based rule can be detected based upon an activity associated with a device. An applicable connection-based rule can be identified based upon the activity, and the applicable connection-based rule can be implemented.

20 Claims, 9 Drawing Sheets

(56) References Cited

U.S. PATENT DOCUMENTS

| | | | | |
|---|---|---|---|---|
| 2005/0159823 | A1* | 7/2005 | Hayes | G05B 15/02 700/19 |
| 2010/0205628 | A1* | 8/2010 | Davis | H04M 1/72533 725/25 |
| 2013/0117385 | A1* | 5/2013 | Pasko | H04N 21/41407 709/206 |
| 2014/0380443 | A1* | 12/2014 | Stark | H04W 12/003 726/7 |

OTHER PUBLICATIONS

Oh et al., "Personal Environment Service based on the Integration of Mobile Communications and Wireless Personal Area Networks," Communications Magazine, IEEE, 2010, vol. 48, Issue 6, pp. 66-72.

* cited by examiner

USER-DEFINED DEVICE CONNECTION MANAGEMENT

BACKGROUND

Over the past several years, the prevalence of networking-enabled devices (e.g., wireless-networking enabled, hardwire-networking enabled, or the like) has increased exponentially. As a result, many modern consumer and/or business devices may include networking capabilities. For example, printers, alarm systems, thermostats, computer peripherals, and the like, may communicate with various devices via wired and/or wireless connections.

In some instances, connections with some devices may be managed by other devices such as laptop computers, mobile phones, tablet computers, gateway devices, or the like. Connections to these devices may therefore be activated or deactivated based on input from users and/or various preferences. In some instances, however, multiple network-enabled devices may be available to a user and/or user device, and as such, a user may have difficulty sorting the various available connections. Furthermore, because of the security risks of conducting wireless and/or wired communications, some connection-based actions must be initiated by a user or other entity associated with a device.

SUMMARY

The present disclosure is directed to user-defined device connection management. A user device (e.g., a laptop computer, a tablet computer, a smart phone, or the like) can be configured to define one or more rules. The rules can include one or more conditions that, when detected by the user device or other entities, can act as trigger events for various actions. The conditions can include, but are not limited to, one or more location-based conditions, one or more connection-based conditions, one or more proximity-based conditions, one or more context-based conditions, and/or other types of conditions. The rules also can include actions that, if the conditions are detected, are invoked by the rules. The rules can include any number of conditions and/or any number of actions. Defining the rules therefore can include specifying conditions for the rules and specifying actions that are taken if the conditions are detected.

The user device can store the rules at the user device or at a remote location such as a database, server, cloud storage device, combinations thereof, or the like. A connection management application can be executed by the user device to create and/or store the rules, and to monitor various conditions associated with the user device. According to various embodiments, the connection management application can monitor networking connections associated with the user device and detect any changes in the networking connections. The connection management application also can monitor a location associated with the user device and detect any changes in location including, but not limited to, leaving a location, entering a location, moving within a location, leaving a proximity of a location, entering a proximity of a location, moving within a proximity of a location, combinations thereof, or the like. The connection management application also can track context associated with the user device and detect any changes in the context such as application usage, feature usage, data communications, combinations thereof, or the like.

If the connection management application detects any changes in connections, locations, proximities, contexts, or other defined conditions, the connection management application can be configured to invoke one or more connection-based rules, proximity-based rules, location-based rules, context-based rules, and/or other rules. In various embodiments, the connection management application can determine, at any time, if any change in location, proximity, connections, or context corresponds to any rules and, if so, invoke the affected rules. The connection management application also can be configured to implement the rules that are applicable at any particular time. Implementing the rules can include, but is not limited to, establishing connections with various hardware devices, transmitting preferences or settings to the hardware devices, disconnecting from the hardware devices, combinations thereof, or the like. Implementing the rules also can include generating and/or transmitting commands to hardware devices, if desired.

According to one aspect of the concepts and technologies disclosed herein, a device is disclosed. The device can include a processor and a memory. The memory can store computer-executable instructions that, when executed by the processor, cause the processor to perform operations. The operations can include defining a connection-based rule including a connection-based condition and an action to be taken when the connection-based condition is detected; detecting application (e.g., applicability or relevance) of the connection-based rule based upon an activity associated with the device; identifying, based upon the activity, an applicable connection-based rule; and implementing the applicable connection-based rule.

In some embodiments, defining the connection-based rule can include defining a condition for the connection-based rule; defining the action, the action including an action to be taken if the condition for the connection-based rule is detected; and storing the connection-based rule. In some embodiments, the connection-based rule can be stored in the memory. In some embodiments, detecting application of the connection-based rule can include monitoring activity associated with the device; and determining that the connection-based condition has been detected.

In some embodiments, the connection-based condition relates to a network condition. The network condition can include one condition selected from a group of conditions including connecting to a network connection, disconnecting from the network connection, and modifying the network connection. In some embodiments, the connection-based condition further can include a location-based condition. The location-based condition can relate to a geographic location. The location-based condition can include one location condition selected from a group of location conditions including entering the geographic location, exiting the geographic location, and moving within the geographic location.

In some embodiments, the connection-based condition further can include a proximity-based condition. The proximity-based condition can relate to a proximity of a geographic location. The proximity-based condition can include one proximity condition selected from a group of proximity conditions including entering the proximity of the geographic location, exiting the proximity of the geographic location, and moving within the proximity of the geographic location. In some embodiments, the connection-based condition further can include a context-based condition. The context-based condition can relate to an operating context. The context-based condition can relate to one context selected from a group of contexts including activating an application, deactivating the application, and interacting with the application. In some embodiments, implementing the applicable connection-based rule can include connecting to a hardware device. In some embodiments, implementing the applicable connection-based rule further can include transmitting preferences to the hardware device, and transmitting session data to the hardware device.

According to another aspect of the concepts and technologies disclosed herein, a computer storage medium is disclosed. The computer storage medium can have computer-executable instructions stored thereon that, when executed by a processor, cause the processor to perform operations. The operations can include defining a connection-based rule including a connection-based condition and an action to be taken when the connection-based condition is detected; detecting application (e.g., applicability or relevance) of the connection-based rule based upon an activity associated with a user device; identifying, based upon the activity, an applicable connection-based rule; and implementing the applicable connection-based rule.

In some embodiments, defining the connection-based rule can include defining a condition for the connection-based rule; defining the action, the action including an action to be taken if the condition for the connection-based rule is detected; and storing the connection-based rule. In some embodiments, detecting application of the connection-based rule can include monitoring activity associated with the user device; and determining that the connection-based condition has been detected. In some embodiments, the connection-based condition can relate to a network condition. The network condition can include one condition selected from a group of conditions including connecting to a network connection, disconnecting from the network connection, and modifying the network connection. In some embodiments, the connection-based condition further can include a location-based condition, a proximity-based condition, or a context-based condition. Implementing the applicable connection-based rule can include connecting to a hardware device.

According to yet another aspect, a method is disclosed. The method can include defining, at a user device that can include a processor that executes a connection management application, a connection-based rule. The connection-based rule can include a connection-based condition and an action to be taken when the connection-based condition is detected. The method further can include detecting, by the user device, application (e.g., applicability or relevance) of the connection-based rule based upon an activity associated with the user device; identifying, by the user device and based upon the activity, an applicable connection-based rule; and implementing, by the user device, the applicable connection-based rule.

In some embodiments, defining the connection-based rule can include defining a condition for the connection-based rule; defining the action, the action including an action to be taken if the condition for the connection-based rule is detected; and storing the connection-based rule at memory of the user device. In some embodiments, detecting application of the connection-based rule can include monitoring activity associated with the user device; and determining that the connection-based condition has been detected. In some embodiments, the connection-based condition can relate to a network condition. The network condition can include one condition selected from a group of conditions including connecting to a network connection, disconnecting from the network connection, and modifying the network connection. In some embodiments, the connection-based condition further can include a location-based condition, a proximity-based condition, or a context-based condition. Implementing the applicable connection-based rule can include connecting to a hardware device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
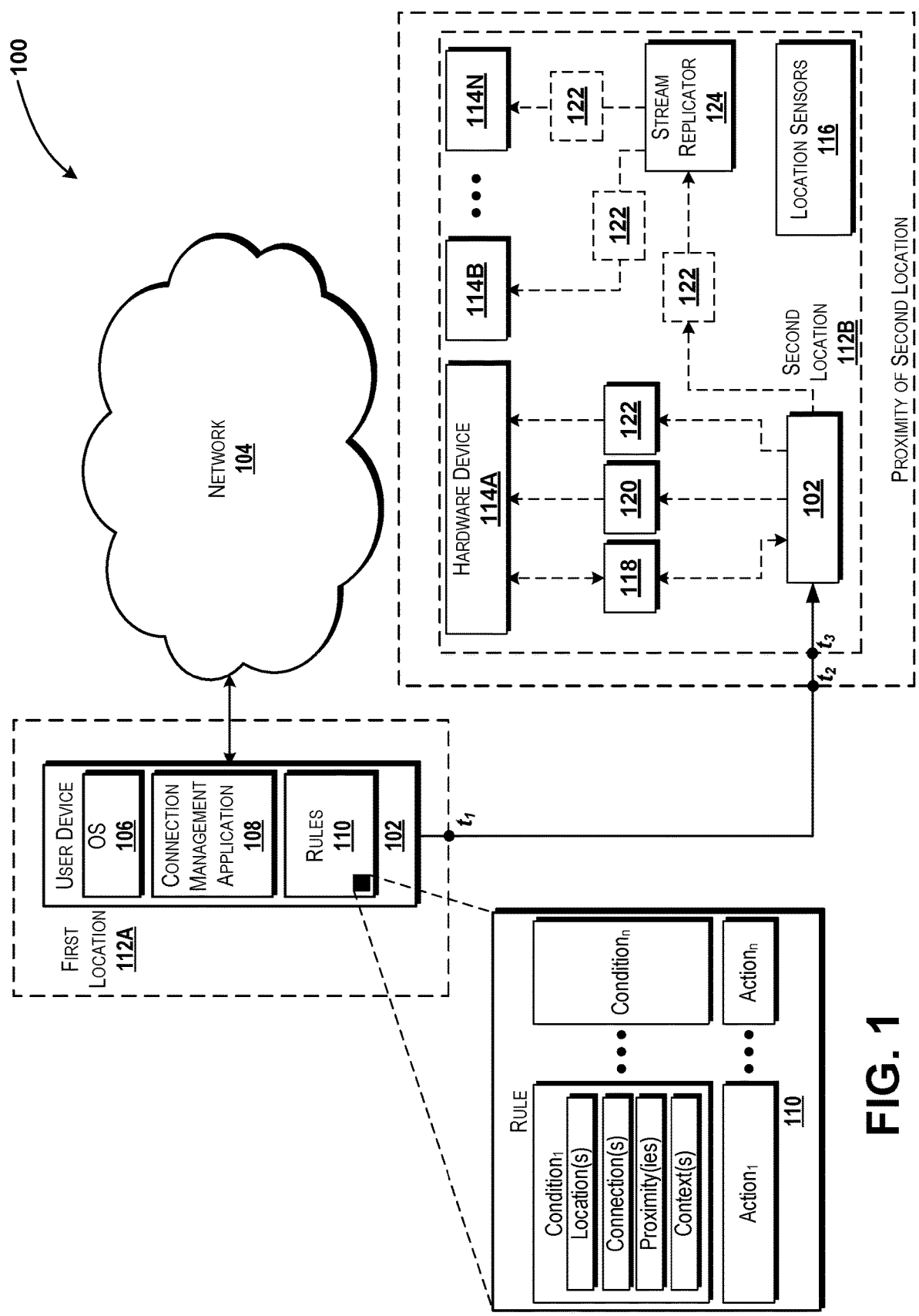
FIG. 1 is a system diagram illustrating an illustrative operating environment for various embodiments of the concepts and technologies described herein.

The following detailed description is directed to user-defined device connection management. A user device (e.g., a laptop computer, a tablet computer, a smart phone, or the like) can be configured to define one or more rules. The rules can include one or more conditions that, when detected by the user device or other entities, can act as trigger events. The conditions can include, but are not limited to, one or more location-based conditions, one or more connection-based conditions, one or more proximity-based conditions, one or more context-based conditions, and/or other types of conditions. The rules also can include actions that, if the conditions are detected, are invoked by the rules. The rules can include any number of conditions and/or any number of actions. Defining the rules therefore can include specifying conditions for the rules and specifying actions that are taken if the conditions are detected.

The user device can store the rules at the user device or at a remote location such as a database, server, cloud storage device, combinations thereof, or the like. A connection management application can be executed by the user device to create and/or store the rules, and to monitor various conditions associated with the user device. According to various embodiments, the connection management application can monitor networking connections associated with the user device and detect any changes in the networking connections. The connection management application also can monitor a location associated with the user device and detect any changes in location including, but not limited to, leaving a location, entering a location, moving within a location, entering a proximity of a location, leaving a proximity of a location, moving within a proximity of a location, combinations thereof, or the like. The connection management application also can track context associated with the user device and detect any changes in the context such as application usage, feature usage, data communications, combinations thereof, or the like.

If the connection management application detects any changes in connections, locations, proximities, contexts, or other conditions, the connection management application can be configured to invoke one or more connection-based rules, proximity-based rules, location-based rules, context-based rules, and/or other rules. In various embodiments, the connection management application can determine, at any time, if any change in location, proximity, connections, or context corresponds to any rules and, if so, invoke the affected rules. The connection management application also can be configured to implement the rules that are applicable at any particular time. Implementing the rules can include, but is not limited to, establishing connections with various hardware devices, transmitting preferences or settings to the hardware devices, disconnecting from the hardware devices, combinations thereof, or the like. Implementing the rules also can include generating and/or transmitting commands to hardware devices, if desired.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for user-defined device connection management will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more server computers, desktop computers, mobile telephones, laptop computers, tablet computers, vehicle computing systems, wearable computing devices or systems (e.g., the GOOGLE GLASS family of products from Google Inc. in Mountain View, Calif., the IWATCH family of products from Apple Corporation in Cupertino, Calif., other wearables, and the like), implantable computing devices or systems, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a mobile telephone or smartphone. It should be understood that this embodiment is illustrative, and should not be construed as being limiting in any way.

The user device 102 can execute an operating system 106 and one or more application programs such as, for example, a connection management application 108. The operating system 106 can include a computer program for controlling the operation of the user device 102. The connection management application 108 can include an executable program configured to execute on top of the operating system 106 to provide various functions as illustrated and described herein for user-defined device connection management.

According to various embodiments, the connection management application 108 can be configured to create and manage one or more connection-based rules ("rules") 110. The rules 110 can be used by the connection management application 108 to manage how the user device 102 connects to various peripheral devices, hardware, other devices, networking equipment, combinations thereof, or the like, as will be explained in more detail below. In particular, as shown in FIG. 1, the user device 102 can be mobile and therefore can move from a first location 112A to a second location 112B. These two locations 112A, 112B and other geographic locations (not shown in FIG. 1) are hereinafter collectively and/or generically referred to as "locations 112." The locations 112 can also correspond to two locations within another location such as a home, office, store, business, combinations thereof, or the like. Of course, as is generally understood, mobile devices such as the user device 102 can move from, to, between, and/or within any number of locations 112, and as such, the illustrated embodiment of two locations 112 should be understood as being illustrative of the concepts and technologies described herein.

In the illustrated embodiment, the second location 112B may correspond, for example, to an office, home, or other location at which various hardware devices 114A-N (hereinafter collectively and/or generically referred to as "hardware devices 114") are located. According to various embodiments of the concepts and technologies described herein, the hardware devices 114 can correspond to audio systems (e.g., stereos, speakers, amplifiers, entertainment systems, combinations thereof, or the like); computers and/or computing devices (e.g., laptop computers, desktop computers, tablet computers, wearable computers, implantable computers, set-top boxes, IPTV devices, mobile telephones or smartphones, vehicle computing systems, home gateways, combinations thereof, or the like); smart appliances; alarm systems; home control devices (e.g., thermostats, lighting systems, locks, cameras, gateway devices, set-top boxes, combinations thereof, or the like); other devices; combinations thereof; or the like.

The user device 102 can leave the first location 112A at a first time $t_1$ and enter a proximity of the second location 112B at a second time $t_2$. At a third time $t_3$, the user device 102 can enter the second location 112B. According to various embodiments of the concepts and technologies described herein, the connection management application 108 can control how the user device 102 connects to and/or interacts with the hardware devices 114 at the second location 112B when the user device 102 enters the proximity of the second location 112B and/or enters the second location 112B. As will be explained in more detail below, the connection management application 108 can be configured to control how the user device 102 connects to the hardware devices 114 and/or otherwise controls connections using the rules 110.

The rules 110 can include, but are not limited to, one or more conditions and one or more actions. The conditions can include trigger events that, if triggered, cause the user device 102 to take the actions. As shown in FIG. 1, the rules 110 can include any number of conditions (Condition$_1$, . . . , Condition$_n$), and any number of actions (Action$_1$, . . . , Action$_n$). Thus, a particular rule 110 can include multiple conditions and/or multiple actions, and any number of rules 110 can be stored by the user device 102. Although the rules 110 are illustrated in FIG. 1 as being stored at the user device 102, it should be understood that this example is illustrative. In particular, some embodiments of the concepts and technologies described herein rely upon remote storage of the rules 110, e.g., in a database, data store, server, or other storage device (not shown in FIG. 1) located remotely from the user device 102. In some of these embodiments (where the rules 110 are stored remotely with regard to the user device 102), the user device 102 can obtain the rules 110 at various times and/or based upon various considerations such as, for example, entry into a location, connection to a network connection, combinations thereof, or the like.

As shown in FIG. 1, the rules 110 can include various types of conditions including, but not limited to, location-based conditions (labeled "location(s)" in FIG. 1), connection-based conditions (labeled "connection(s)" in FIG. 1), proximity-based conditions (labeled "proximity(ies)" in FIG. 1), context-based conditions (labeled "context(s)" in FIG. 1), and/or other types of conditions (not shown in FIG. 1). Thus, the conditions can define various aspects of location, connections, proximities, and/or contexts as trigger events for various actions. According to various embodiments of the concepts and technologies described herein, the rules 110 can include at least one connection-based condition. It should be understood that this example is illustrative and therefore should not be construed as being limiting in any way.

When the user device 102 enters a location 112, e.g., the second location 112B (or a proximity thereof), the connection management application 108 can detect entry of the user device 102 into the second location 112B and/or the proximity of the second location 112B. According to various embodiments of the concepts and technologies described herein, the connection management application 108 can be executed to, among other things, monitor location, context, connections, and/or other aspects of the user device 102 and detect, upon a change in a location, context, connection, proximity, or other aspects, application of one or more of the rules 110. According to some embodiments, the connection management application 108 can detect a change in a condition for a rule 110 and determine, based upon the change, that a particular rule 110 is applicable in the current situation. It should be understood that this example is illustrative and therefore should not be construed as being limiting in any way.

The rules 110 can define one or more actions that should be taken (e.g., by the user device 102) in response to detecting the conditions. For example, the action can correspond to "connect to one or more hardware devices 114," "disconnect from one or more hardware devices 114," "forward incoming communications to another number," "disable forwarding of communications," "adjust settings associated with one or more hardware devices 114," "prompt a user for information," "change a status," "update a profile," combinations thereof, or the like. Thus, upon the user device 102 entering a location 112 such as the second location 112B (or a proximity thereof), the connection management application 108 can detect a rule 110 that is triggered by entry into the second location 112B or the proximity thereof, and take various actions in response to detecting this change. In the example embodiment shown in FIG. 1, the user device 102 can be configured to connect to the hardware device 114A when the user device 102 enters the second location 112B. It should be understood that this example is illustrative and therefore should not be construed as being limiting in any way.

The entry of the user device 102 into the second location 112B and/or a proximity thereof, as well as movements within the second location 112B can be tracked and/or detected by one or more location sensors 116, in some embodiments. According to various other embodiments, the user device 102 can be configured to track its location and/or to receive location updates (e.g., from a location server associated with a network such as a cellular network, etc.) without using the location sensors 116. In still other embodiments, the user device 102 can determine its location using onboard sensors and/or devices as well as the location sensors 116. Regardless of how the user device 102 detects its location, the user device 102 can use this location to provide the functionality illustrated and described herein.

In the example shown in FIG. 1, the user device 102 can take various actions. For example, the user device 102 can exchange connection communications 118 with the hardware device 114A to pair and/or create a connection with the hardware device 114A. In the illustrated embodiment, a rule 110 can specify that when the user device 102 (or the connection management application 108) detects the hardware device 114A (e.g., by detecting the availability of a connection to the hardware device 114A), the connection management application 108 can cause the user device 102 to exchange the connection communications 118 with the hardware device 114A to initiate a connection with the hardware device 114A. The rules 110 also can specify other actions that will be taken by the user device 102. As such, it should be understood that this example is illustrative and therefore should not be construed as being limiting in any way.

The user device 102 and the hardware device 114A can connect to one another via the exchange of the connection communications 118 (e.g., obtaining an IP address, creating a peer-to-peer network or connection, or the like). Thus, the user device 102 and the hardware device 114A can communicate with one another, e.g., via Bluetooth, Wi-Fi, ZIGBEE, or the like in response to the user device 102 entering the proximity of the second location 112B, entering the second location 112B, detecting the availability of a connection with the hardware device 114A, and/or other conditions such as a context, or the like. It should be understood that this example is illustrative and therefore should not be construed as being limiting in any way.

Upon establishing a connection with the hardware device 114A, the user device 102 can be configured, in some embodiments, to take additional actions. In the illustrated embodiment, the user device 102 can send, to the hardware device 114A, one or more preferences or settings associated with the user device 102. In the illustrated embodiment, the preferences 120 can specify one or more settings for the hardware device 114A such as, for example, volume controls, video controls, temperature controls, power controls (on/off/sleep/standby, etc.), or the like. Thus, the user device 102 can be configured to send the preferences 120 to the hardware device 114A when the connection between the user device 102 and the hardware device 114A is established. It should be understood that this example is illustrative and therefore should not be construed as being limiting in any way.

Additionally, or alternatively, the user device 102 can be configured to send session data 122 to the hardware device 114A. Thus, the user device 102 can send or stream, for example, session data 122 such as, for example, audio data, video data, device control data, other types of data, combinations thereof, or the like, to the hardware device 114A after establishing communications with the hardware device 114A. It should be understood that this example is illustrative and therefore should not be construed as being limiting in any way.

It also should be understood that the first location 112A and the second location 112B illustrated and described with reference to FIG. 1 can correspond to two locations within a building, area, or the like, as mentioned above. Thus, it can be appreciated that the concepts and technologies described herein can be used to control connections with the hardware devices 114 at or within a single building, office, home, floor, room, combinations thereof, or the like. In particular, embodiments of the concepts and technologies described herein can be used to control how the user device 102 connects to various hardware devices 114 within a home, office, building, business, or other location 112. It should be understood that this example is illustrative and therefore should not be construed as being limiting in any way.

In an example embodiment, the connection management application 108 can be configured to connect to a first hardware device 114 (e.g., the hardware device 114A). If the user device 102 moves within the second location 112B to a particular location (e.g., if the user device 102 moves from a first floor of a home that corresponds to the second location 112B to a second floor of the home that corresponds to the second location 112B), the connection management application 108 can be configured to disconnect from the hardware device 114A and connect to a second hardware device 114 (e.g., the hardware device 114B, the hardware device 114N, or the like). Thus, embodiments of the concepts and technologies described herein can control connections not only upon detecting movement of the user device 102 to or from locations 112, but also in response to detecting particular movements of the user device 102 within one or more of the locations 112. It should be understood that this example is illustrative and therefore should not be construed as being limiting in any way.

According to various embodiments, the user device 102 can use various onboard and/or off-board sensors and/or devices to track movement within a location 112 as mentioned above. Thus, for example, when the user device 102 determines that it has entered a location 112 (e.g., the second location 112B), the user device 102 can be configured to track movements within the second location 112B. Thus, for example, the user device 102 can use a location processor and/or one or more orientation and/or movement sensors such as magnetometers, accelerometers, gyroscopes, and/or the like to track movement within the second location 112B. The user device 102 also can use signal strength associated with various network connections and/or hardware devices 114 to prompt changes to the connections as illustrated and described herein. Movement within the second location 112B (or other locations 112) can be used to perform various functions as illustrated and described herein for managing connections.

In one contemplated embodiment, the user device 102 may enter the second location 112B. The user device 102 can connect to a speaker system on a first floor of the second location 112B and begin streaming audio data to the speaker system (e.g., as the session data 122). Subsequently, the user device 102 may be taken upstairs by a user or other entity. Various embodiments of the concepts and technologies described herein can detect movement of the user device 102 to the upstairs, and such movement may trigger a rule 110 as illustrated and described herein. The movement upstairs may be detected by determining that another hardware device 114 such as a second speaker system is close to the user device 102, by tracking movement as mentioned above, by measuring signal strength between the user device 102 and other devices such as the speaker system and the other hardware device 114, combinations thereof, or the like. The movement also can be detected by various motion detection devices and the like including, but not limited to, the location sensors 116, a gateway device, or the like.

Regardless of how the movement is detected, the connection management application 108 can be configured, e.g., via one or more rules 110, to, for example, connect to the other hardware device 114 that is upstairs, to cease streaming audio to the speaker system, and to begin streaming audio to the other hardware device 114. Thus, embodiments of the concepts and technologies described herein can be used to alter what hardware devices 114 are connected to by the user device 102 and/or what hardware devices 114 are interacted with (e.g., by streaming data to) by the user device 102. It should be understood that this example is illustrative and therefore should not be construed as being limiting in any way.

In some embodiments, embodiments of the concepts and technologies described herein can also support interactions with a stream replicator 124. The stream replicator 124 can include a processor, a memory, and a transceiver. The stream replicator 124 can be configured to interact with the user device 102 as one of the hardware devices 114, in some embodiments.

The stream replicator 124 can be configured to replicate a stream of data (e.g., a stream of the session data 122) and relay that stream of data to two or more other hardware devices 114. Thus, in one contemplated embodiment, the stream replicator 124 can be connected to by the user device 102; session data 122 can be streamed to the stream replicator 124; and the stream replicator 124 can clone the streamed session data 122 and relay two or more copies of the session data 122 to two or more hardware devices 114 (as shown in FIG. 1). Thus, some embodiments of the concepts and technologies described herein can be used to connect a user device to multiple hardware devices 114 via a single hardware device (e.g., the stream replicator 124) instead of enabling only a single peer-to-peer stream for the user device 102 and the various hardware devices 114. It should be understood that this example is illustrative and therefore should not be construed as being limiting in any way.

In practice, the user device 102 can be configured (e.g., via execution of the connection management application 108) to define one or more rules 110. The rules 110 can include one or more conditions that can act as trigger events. The conditions can include, but are not limited to, one or more location-based conditions, one or more connection-based conditions, one or more proximity-based conditions, one or more context-based conditions, and/or other types of conditions. The rules 110 also can include actions that, if the conditions are detected by the user device 102, are invoked by the rules 110. It should be understood that the rules 110 can include any number of conditions and/or any number of actions. Thus, defining the rules 110 can include specifying conditions for the rules 110 and specifying actions that are taken if the conditions are detected.

The user device 102 can be configured to store the rules 110. The rules 110 can be stored at the user device 102 or at a remote location such as a database, server, cloud storage device, combinations thereof, or the like. The connection management application 108 can be executed to create and/or store the rules 110, and to monitor various conditions associated with the user device 102. According to various embodiments, the connection management application 108 can monitor networking connections associated with the user device 102 and detect any changes in the networking connections. Changes that can be detected include, but are not limited to, detecting connection to a networking connection, disconnection from a networking connection, detecting presence of a network (e.g., detecting a broadcast SSID for a WiFi hotspot), or the like.

The connection management application 108 can also monitor a location associated with the user device 102. According to various embodiments, the connection management application 108 can detect any changes in location including, but not limited to, leaving a location, entering a location, moving within a location, entering a proximity of a location, leaving a proximity of a location, moving within a proximity of a location, combinations thereof, or the like. The connection management application 108 can be configured to track proximity to particular locations and detect any changes in the proximity to these locations. The connection management application 108 also can be executed to monitor various contexts associated with the user device 102. According to various embodiments, the connection management application 108 can monitor application usage, feature usage, data communications, combinations thereof, or the like, associated with the user device 102 and/or detect changes in the contexts.

If the connection management application 108 detects any changes in connections, locations, proximities, contexts, or other defined conditions, the connection management application 108 can be configured to invoke one or more connection-based rules, proximity-based rules, location-based rules, context-based rules, and/or other rules 110. In various embodiments, the connection management application 108 can determine, at any time, if any change in location, proximity, connections, or context corresponds to any rules 110 and, if so, invoke the corresponding rules 110.

The connection management application 108 also can be configured to implement the rules 110 that are applicable at any particular time. Implementing the rules 110 can include, but is not limited to, establishing connections with various hardware devices 114, transmitting preferences or settings to the hardware devices 114, disconnecting from the hardware devices 114, combinations thereof, or the like. Implementing the rules also can include generating and/or transmitting commands to hardware devices 114, if desired. It should be understood that these examples are illustrative and therefore should not be construed as being limiting in any way.

Although the connection management application 108 is illustrated in FIG. 1 as an application executed by the user device 102, it should be understood that the connection management application 108 also can be executed by a server computer (not shown in FIG. 1) or other computing device, and therefore can operate as a callable service or other type of application. Thus, the user device 102 can be configured to communicate with the service to provide location information (or such information can be provided to the service by a location server and/or the location sensors 116), and the service can provide creation and management of the rules 110, if desired. As such, the illustrated embodiment should be understood as being illustrative of only some contemplated embodiments and should not be construed as being limiting in any way.

FIG. 1 illustrates one user device 102, one network 104, two locations 112, three hardware devices 114, one set of location sensors 116, and one stream replicator 124. It should be understood, however, that various implementations of the operating environment 100 can include zero, one, or more than one user device 102; zero, one, or more than one network 104; zero, one, two, or more than two locations 112, zero, one, two, three, or more than three hardware devices 114; zero, one, or more than one set of location sensors 116; and/or zero, one, or more than one stream replicator 124. As such, the illustrated embodiment should be understood as being illustrative, and should not be construed as being limiting in any way.

Figure 2:
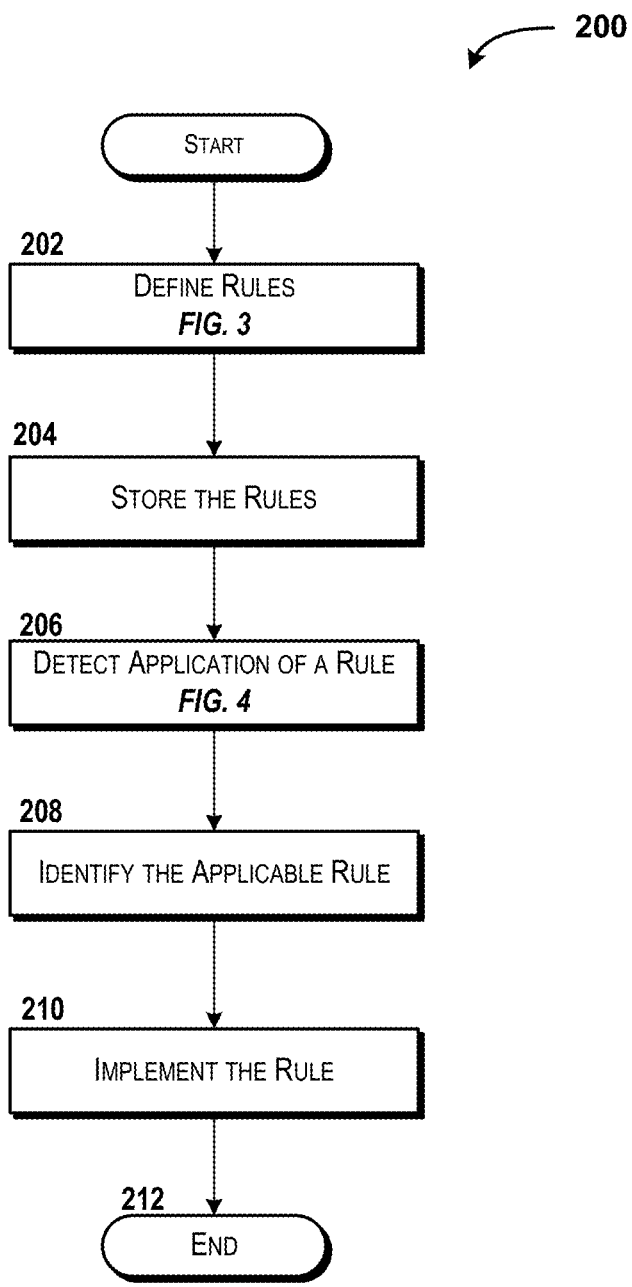
FIG. 2 is a flow diagram showing aspects of a method for creating and implementing connection-based rules, according to an illustrative embodiment of the concepts and technologies described herein.

Turning now to FIG. 2, aspects of a method 200 for creating and implementing connection-based rules will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, to perform one or more operations and/or causing the processor to direct other components of the computing system or device to perform one or more of the operations.

For purposes of illustrating and describing the concepts of the present disclosure, the methods disclosed herein are described as being performed by the user device 102 via execution of one or more software modules such as, for example, the connection management application 108. It should be understood that additional and/or alternative devices and/or network nodes can provide the functionality described herein via execution of one or more modules, applications, and/or other software including, but not limited to, the connection management application 108. Thus, the illustrated embodiments are illustrative, and should not be viewed as being limiting in any way.

The method 200 begins at operation 202. At operation 202, the user device 102 can define the rules 110. Additional details of defining the rules 110 are illustrated and described below with reference to FIG. 3. Briefly, the user device 102 can define the rules 110 by creating conditions that can act as trigger events or (e.g., connection-based trigger events) and specifying actions taken or performed in response to the conditions or other trigger events. These operations can be repeated until one or more rules 110 have been defined. Because the rules 110 can be defined in other ways (e.g., by hardware and/or software providers, service providers, network operators, or the like), it should be understood that this example is illustrative and therefore should not be construed as being limiting in any way.

From operation 202, the method 200 can proceed to operation 204. At operation 204, the user device 102 can store the rules 110 created in operation 202. As explained above, the rules 110 can be stored at the user device 102, in some embodiments. In some other embodiments, the rules 110 can be stored at a location that is remote from the user device 102, for example a cloud storage device, a remote data storage device, a server computer, a database, combinations thereof, or the like. Thus, some embodiments of the concepts and technologies described herein can enable remote storage and/or retrieval of the rules 110, if desired. It should be understood that this example is illustrative and therefore should not be construed as being limiting in any way.

From operation 204, the method 200 can proceed to operation 206. At operation 206, the user device 102 can detect application of a rule 110 or otherwise determine that a rule is applicable or applies. Thus, in operation 206, the user device 102 can determine that one or more rules 110 generated and/or stored in operations 202-204 is or are relevant to some activity or state associated with the user device 102. It can be appreciated with reference to the concepts and technologies described herein, that the activity or state can include, but are not limited to, changes in location (e.g., entering, leaving, and/or moving within a location); changes to proximities (e.g., entering, leaving, and/or moving within a proximity to a location); changes to connections (e.g., detecting availability of, connecting to, disconnecting from, and/or otherwise changing connection properties for a network connection); changes to a context (e.g., beginning or end of a contextual state, changes to contextual state, or the like); combinations thereof; or the like. An example embodiment for detecting application of a rule 110 is illustrated and described below with reference to FIG. 4. Because the application of one or more rules 110 can be detected in additional and/or alternative manners, it should be understood that this example is illustrative and therefore should not be construed as being limiting in any way.

From operation 206, the method 200 can proceed to operation 208. At operation 208, the user device 102 can identify an applicable rule 110. Thus, in operation 208, the user device 102 can identify a rule 110 that prompted the decision in operation 206 that a rule 110 applies. In various embodiments, detecting application of a rule 110 as illustrated and described herein with reference to operation 206 can include identifying an affected or relevant rule 110 and/or otherwise determining that a rule 110 is relevant, applicable, or the like. Thus, for example, if a location of the user device 102 is being tracked, and entry into a location 112 prompts the user device 102 to detect application of a rule 110, the user device 102 can determine that the current location relates to a rule 110. Thus, the user device 102 can, in operation 208, search the rules 110 for a rule 110 that relates to a current location 112. Because the relevant rule 110 can be identified in additional and/or alternative manners, it should be understood that this example is illustrative and therefore should not be construed as being limiting in any way.

According to various embodiments of the concepts and technologies described herein, the rules 110 can include connection-based conditions. Thus, operation 208 can include identifying network connections to which the user device 102 is connected and searching the rules 110 to identify rules 110 that relate to that connection. Operation 208 also can include, for example, detecting a current location or proximity to a location and identifying rules 110 that relate to that location (or proximity). Because the applicable rules 110 can be identified in additional and/or alternative manners, it should be understood that these examples are illustrative and therefore should not be construed as being limiting in any way.

From operation 208, the method 200 can proceed to operation 210. At operation 210, the user device 102 can implement the rule 110. Thus, in operation 210, the user device 102 can implement the actions associated with the rule 110 that is determined to be implicated in operation 208. In implementing the actions, the user device 102 can analyze the rule 110, identify the actions to be performed, and take actions to implement the actions. The user device 102 also can be configured to send information or instructions to other devices to implement the actions in addition to, or instead of, implementing the actions at the user device 102.

In some embodiments, for example, the actions specified by the rules 110 can be implemented at the user device 102. For example, if an action associated with a rule 110 is applied at the user device 102, operation 210 can include the user device 102 (e.g., via execution of the connection management application 108 and/or other applications) controlling an application at the user device 102 (e.g., adjusting a volume for a playback application, increasing or decreasing a data transfer rate, activating or deactivating a network adapter such as a BLUETOOTH or WiFi adapter, combinations thereof, or the like); formatting and/or adjusting output associated with the user device 102; sending data to various recipients; combinations thereof; or the like. Thus, the user device 102 can be configured to execute the action associated with the rule 110 at the user device 102 and/or take actions to control various outputs and/or communications between the user device 102 and other devices, if desired. Because other actions can be taken, it should be understood that this example is illustrative and therefore should not be construed as being limiting in any way.

In some other embodiments, the actions specified by the rules 110 can be implemented at other devices. For example, if an action associated with a rule 110 is applied outside of the user device 102, operation 210 can include the user device 102 generating, formatting, and/or transmitting one or more connection communications 118 to initiate, change, and/or terminate communications with one or more hardware devices 114; generating, formatting, and/or transmitting one or more preferences 120 to one or more hardware devices 114; generating, formatting, and/or transmitting session data 122 to the one or more hardware devices 114; other actions; combinations thereof; or the like. Thus, operation 210 can include the user device 102 performing various operations to modify execution at the user device 102 and/or to modify operation of other entities such as the hardware devices 114. Because operation 210 can be implemented in additional and/or alternative manners, it should be understood that these examples are illustrative and therefore should not be construed as being limiting in any way.

From operation 210, the method 200 can proceed to operation 212. The method 200 ends at operation 212.

Figure 3:
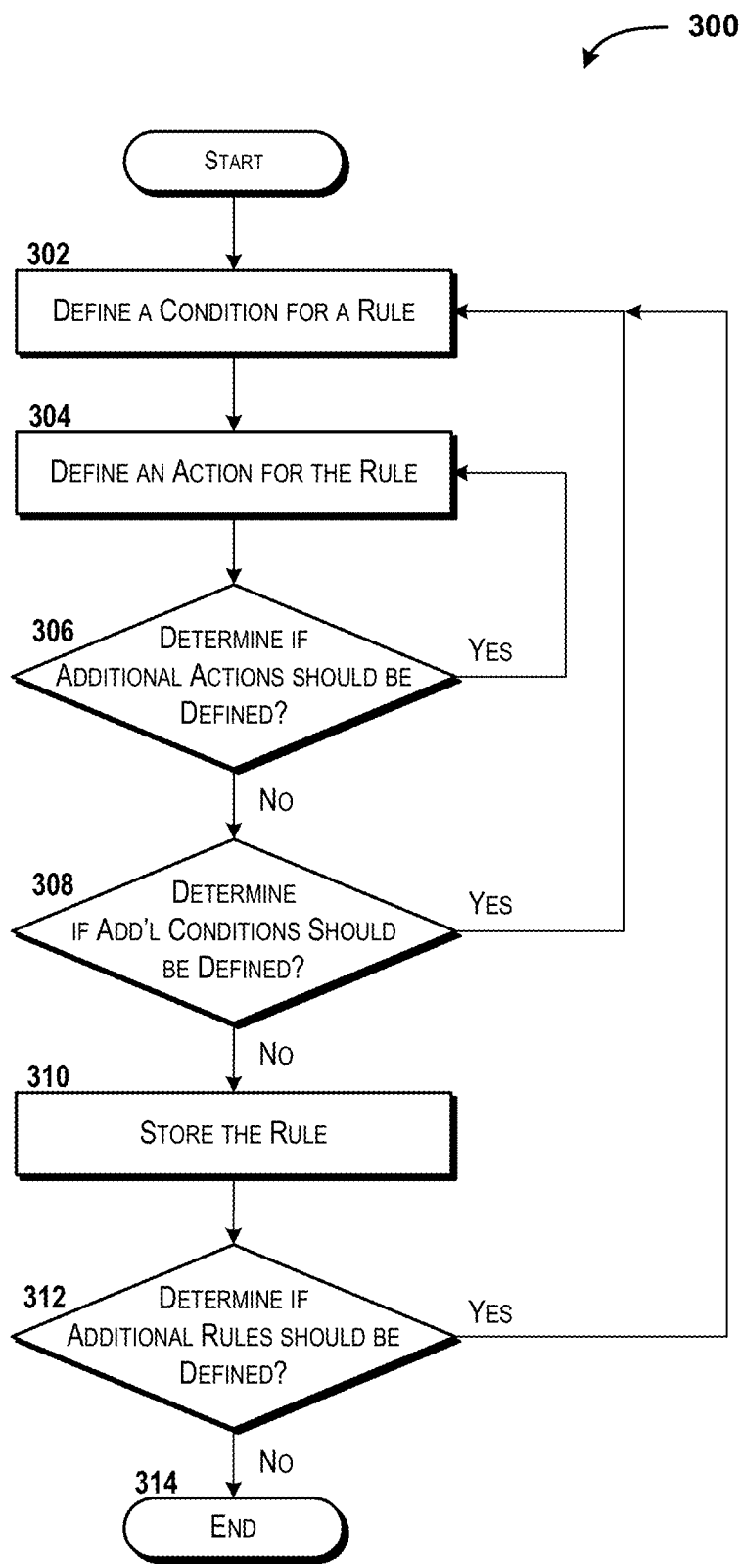
FIG. 3 is a flow diagram showing aspects of a method for defining connection-based rules, according to an illustrative embodiment of the concepts and technologies described herein.

Turning now to FIG. 3, aspects of a method 300 for defining connection-based rules will be described in detail, according to an illustrative embodiment. As shown in FIG. 2, it should be understood that the functionality illustrated and described herein with respect to FIG. 3 can, but is not necessarily, performed by the user device 102 in association with performance of operation 202 of the method 200. Because the functionality illustrated and described herein with reference to FIG. 3 can be performed at additional and/or alternative times, it should be understood that this example is illustrative and therefore should not be construed as being limiting in any way.

The method 300 begins at operation 302. At operation 302, the user device 102 can define a condition for a rule 110. Thus, in operation 302, the user device 102 can define a condition that, if detected by the user device 102 or other entities, will implicate the rule 110 being defined by way of the method 300. As explained in detail above with reference to FIG. 1, the condition defined in operation 302 can include, but is not limited to, a location-based condition, a connection-based condition, a proximity-based condition, a context-based condition, combinations thereof, or the like. Thus, the user device 102 can define, in operation 302, that a particular rule 110 being defined by execution of the method 300 can be implicated and/or determined to be relevant when presence at a particular location is detected, when proximity to a particular location is detected, when a particular connection or change in a connection is detected, when a particular context is detected, combinations thereof, or the like. It should be understood that these examples are illustrative and therefore should not be construed as being limiting in any way.

From operation 302, the method 300 can proceed to operation 304. At operation 304, the user device 102 can define an action for a rule 110. Thus, in operation 304, the user device 102 can define, for a rule 110 being defined by the method 300, what action will be taken in response to detecting the condition defined by the rule condition defined in operation 302. Thus, for example, if the rule 110 relates to a particular application function that is to be executed when connection to a home network is detected, the action defined in operation 304 can correspond to the application function, and the condition defined in operation 302 can correspond to connection to the home network. It should be understood that this example is illustrative and therefore should not be construed as being limiting in any way.

From operation 304, the method 300 can proceed to operation 306. At operation 306, the user device 102 can determine if additional actions should be defined for the condition defined for the rule 110 in operation 302. In particular, it should be understood that more than one action can be specified for a rule 110. Thus, for example, if a rule 110 specifies a condition such as connection to a particular network connection, the actions can include one or more actions such as, for example, activation of a particular application, adjustment of an output volume, activation of various sensors, modifying various data rates, combinations thereof, or the like. Thus, in operation 306, the user device 102 can determine if more than one action is to be defined for the condition defined in operation 302. If the user device 102 determines, in operation 306, that additional actions should be defined for the condition defined in operation 302, the method 300 can return to operation 304. At operation 304, the user device 102 can define another action for the rule 110 being defined by way of the method 300. Operations 304-306 can be repeated until the user device 102 determines, in any iteration of operation 306, that no additional actions should be defined for the rule 110.

If the user device 102 determines, in operation 306, that additional actions should not be defined for the condition defined in operation 302, the method 300 can proceed to operation 308. At operation 308, the user device 102 can determine if additional conditions should be defined for the rule 110 being defined by way of the method 300. Thus, it can be appreciated that, similar to the defining of actions as illustrated and described above with reference to operations 304-306, that multiple conditions can be defined for a particular rule 110. Thus, for example, the rule 110 can be defined with multiple conditions, each of which can have one or more associated actions. It should be understood that this example is illustrative and therefore should not be construed as being limiting in any way.

According to various embodiments of the concepts and technologies described herein, the conditions for the rules 110 also can be configured in various manners. In particular, the conditions can be configured such that any one of the conditions invokes the associated rule 110; such that only a combination of all of the conditions invokes the rules 110; and/or such that various combinations of the conditions may or may not invoke the rule 110. Thus, for example, the conditions for a rule 110 may be specified as a connection-based condition (e.g., connecting to, modifying a connection to, and/or disconnecting from a particular network) and a location-based condition (e.g., the user device 102 is located at a particular location, leaving a particular location, moving within the location, combinations thereof, or the like). Thus, the rule 110 may be configured to be invoked only if both the connection-based condition and the location-based condition are met; if either of the connection-based condition and the location-based condition are met; and/or if either of the connection-based condition and the location-based condition are met along with another condition (e.g., a context-based condition or a proximity-based condition). It should be understood that this example is illustrative and therefore should not be construed as being limiting in any way.

Thus, in addition to defining multiple conditions, the method 300 can be used to define whether the multiple conditions are all required to invoke the rule 110, whether one of the conditions is enough to invoke the rule, combinations thereof, or the like. If the user device 102 determines, in operation 308, that additional conditions should be defined for a rule 110 being defined by way of the method 300, the method 300 can return to operation 302 and another rule condition can be defined. Operations 302-306 can be repeated until the user device 102 determines, in any iteration of operation 308, that no additional conditions should be defined for a particular rule 110.

If the user device 102 determines, in operation 308, that additional conditions should not be defined for a rule 110, the method 300 can proceed to operation 310. At operation 310, the user device 102 can store the rule 110 defined via performance of operations 302-308. From operation 310, the method 300 can proceed to operation 312.

In operation 312, the user device 102 can determine if additional rules 110 should be defined. Thus, it can be appreciated that the method 300 can be performed to create one or more rules 110. If the user device 102 determines, in operation 312, that additional rules 110 should be defined, the method 300 can return to operation 302. At operation 302, as noted above, a condition for a rule 110 can be defined. Operations 302-312 can be repeated until the user device 102 determines, in any iteration of operation 308, that no additional rules 110 should be defined.

If the user device 102 determines, in operation 312, that additional rules 110 should not be defined, the method 300 can proceed to operation 314. The method 300 can end at operation 314.

Figure 4:
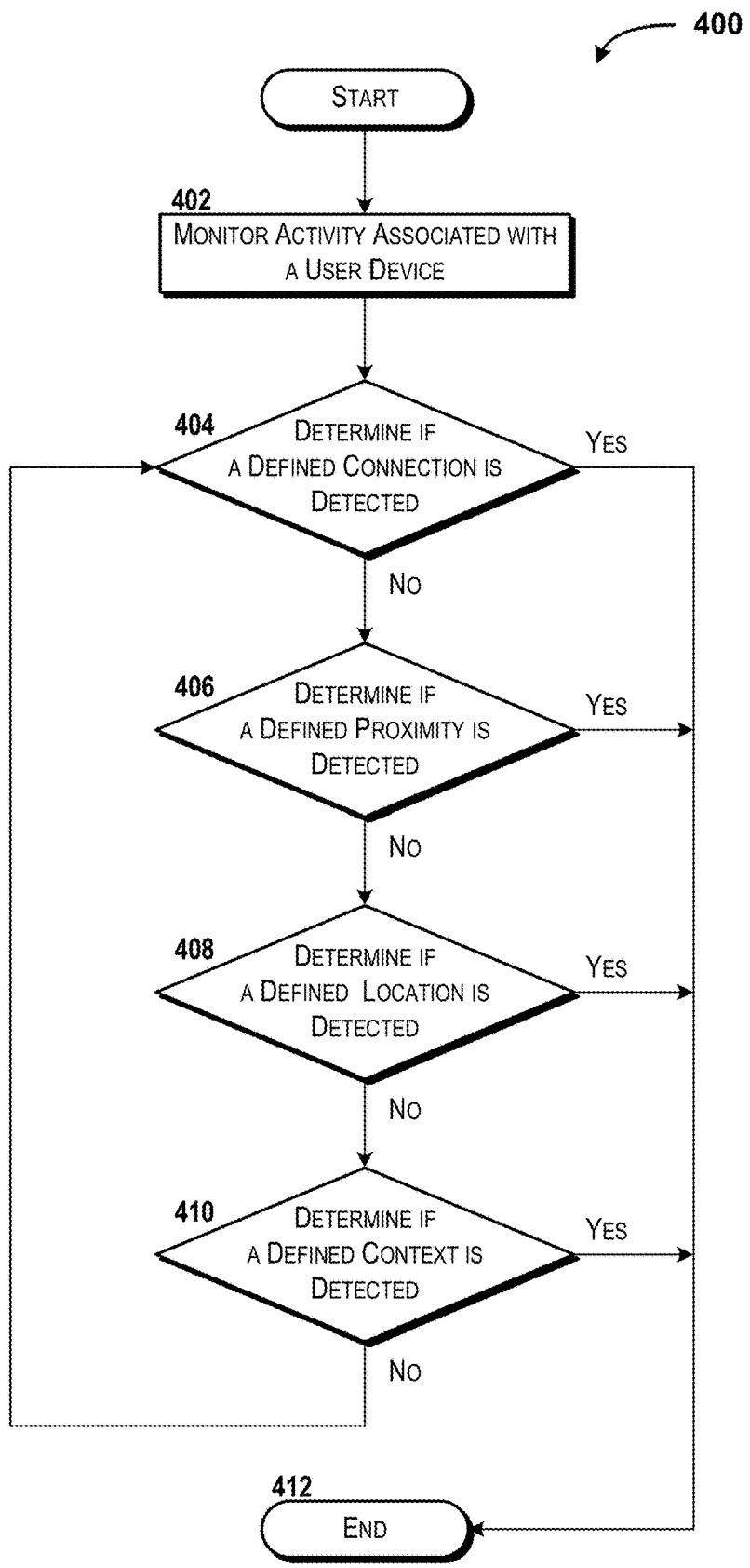
FIG. 4 is a flow diagram showing aspects of a method for detecting application of a connection-based rule, according to an illustrative embodiment of the concepts and technologies described herein.

Turning now to FIG. 4, aspects of a method 400 for detecting application of a connection-based rule will be described in detail, according to an illustrative embodiment. As shown in FIG. 2, it should be understood that the functionality illustrated and described herein with respect to FIG. 4 can, but is not necessarily, performed by the user device 102 in association with performance of operation 206 of the method 200. In some other embodiments, the functionality of the method 400 can be performed by the user device 102 in the background via execution of the connection management application 108 and therefore may not occur within the context of the method 200. Because the functionality illustrated and described herein with reference to FIG. 4 can be performed at additional and/or alternative times, it should be understood that this example is illustrative and therefore should not be construed as being limiting in any way.

The method 400 begins at operation 402. At operation 402, the user device 102 can monitor activity associated with the user device 102. The activity monitored in operation 402 can include, but is not limited to, location information such as a geographic location at which the user device 102 is located, movement to, from, or within a geographic location, or the like. The activity monitored in operation 402 also can include, but is not limited to, proximity information such as a proximity to a geographic location, a building, a network connection or the like. The proximity information also can include information that can reflect the user device 102 moving to, from, or within a proximity to a geographic location or entity (e.g., a building, network connection, or the like). It should be understood that these examples are illustrative and therefore should not be construed as being limiting in any way.

The activity monitored in operation 402 also can include, but is not limited to, connection information. Thus, the activity monitored in operation 402 also can include, but is not limited to, detecting connection to a network connection, disconnection from a network connection, changes to a network connection and/or preferences relating thereto, availability of a network connection, combinations thereof, or the like. It should be understood that these examples are illustrative and therefore should not be construed as being limiting in any way.

The activity monitored in operation 402 also can include, but is not limited to, context information. Thus, the activity monitored in operation 402 also can include, but is not limited to, detecting usage associated with the user device 102 such as, for example, activation, deactivation, and/or interactions with an application; transmission of data; interactions with data and/or applications; history information; combinations thereof; or the like. It should be understood that these examples are illustrative and therefore should not be construed as being limiting in any way.

From operation 402, the method 400 can proceed to operation 404. At operation 404, the user device 102 can determine if a connection defined by a rule 110 (defined location) is detected. Thus, the user device 102 can be configured to monitor connections of the user device 102. The user device 102 can be configured (e.g., via execution of the connection management application 108) to detect any changes to connections such as, for example, connection to a connection; disconnection from a connection; changes to a connection; detecting an available connection (e.g., determining that the user device 102 is within range of a particular networking device or network); combinations thereof; or the like. Thus, the user device 102 can determine, in operation 404, whether or not any change to any network connection has been detected. If the user device 102 determines, in operation 404, that any change to any network connection has not been detected, the method 400 can proceed to operation 406.

At operation 406, the user device 102 can determine if a proximity to a location as defined by a rule 110 (defined proximity) is detected. Thus, the user device 102 can be configured to monitor proximities of the user device 102 to various entities and/or locations. The user device 102 can be configured (e.g., via execution of the connection management application 108) to detect any changes to proximities, to entities, and/or locations such as, for example, entering into a proximity of a particular entity or location; moving within a proximity of a particular entity or location; leaving a proximity of a particular entity or location; combinations thereof; or the like.

Thus, the user device 102 can determine, in operation 406, whether or not any change to any proximity to any entity or location has been detected. In some embodiments, the user device 102 can base the determination of operation 406 upon detecting various connections and/or the availability of the connections (e.g., proximity to a particular WiFi router or hotspot, etc.). It should be understood that this example is illustrative and therefore should not be construed as being limiting in any way. If the user device 102 determines, in operation 406, that any change to any proximity to any entity or location has not been detected, the method 400 can proceed to operation 408.

At operation 408, the user device 102 can determine if presence at a location as defined by a rule 110 (defined location) is detected. Thus, the user device 102 can be configured to monitor a geographic location of the user device 102 and/or to receive location information from other entities such as location servers, location beacons, or the like. In some embodiments, for example, the user device 102 can receive location information from one or more location sensors 116, as illustrated and described above with reference to FIG. 1.

The user device 102 can be configured (e.g., via execution of the connection management application 108) to detect any changes to location such as, for example, arrival at a particular location; movement within a particular location; departure from a particular location; combinations thereof; or the like. Thus, the user device 102 can determine, in operation 408, whether or not any change to any location has been detected. In some embodiments, the user device 102 can base the determination of operation 408 upon detecting various connections and/or the availability of the connections (e.g., connection to a particular WiFi router or hotspot and knowledge of an associated geographic location). It should be understood that this example is illustrative and therefore should not be construed as being limiting in any way.

From operation 408, the method 400 can proceed to operation 410. At operation 410, the user device 102 can determine if a context defined by a rule 110 (defined context) is detected. Thus, the user device 102 can be configured to monitor one or more contexts associated with the user device 102. As explained above, the contexts can include, but are not limited to, application usage; patterns of use of the user device 102; interactions occurring at the user device 102; active applications associated with the user device 102; activity occurring at the user device 102; combinations thereof; or the like. The user device 102 can be configured (e.g., via execution of the connection management application 108) to detect any changes to the contexts such as, for example, activation of particular applications; deactivation of particular applications; use of particular applications; pairing with particular devices; times of day and/or various activities associated therewith; historical usage information; combinations thereof; or the like.

Thus, the user device 102 can determine, in operation 410, whether or not any change to any context has been detected. In some embodiments, the user device 102 can base the determination of operation 410 upon detecting various connections and/or the availability of the connections (e.g., connection to a particular WiFi router or hotspot and knowledge of an associated geographic location). It should be understood that this example is illustrative and therefore should not be construed as being limiting in any way.

If the user device 102 determines, in operation 410, that a defined context is not detected, the method 400 can return to operation 402 and the method 400 can be repeated until a connection-based condition, proximity-based condition, location-based condition, and/or context-based condition is detected. If the user device 102 determines, in operation 410, that the context-based condition has been detected, the method 400 can proceed to operation 412. The method 400 also can proceed to operation 412 from operation 404, if the user device 102 determines, in operation 404, that the defined connection is detected. The method 400 also can proceed to operation 412 from operation 406, if the user device 102 determines, in operation 406, that the defined proximity is detected. The method 400 also can proceed to operation 412 from operation 408, if the user device 102 determines, in operation 408, that presence at the defined location is detected. The method 400 can end at operation 412.

Figure 5A:
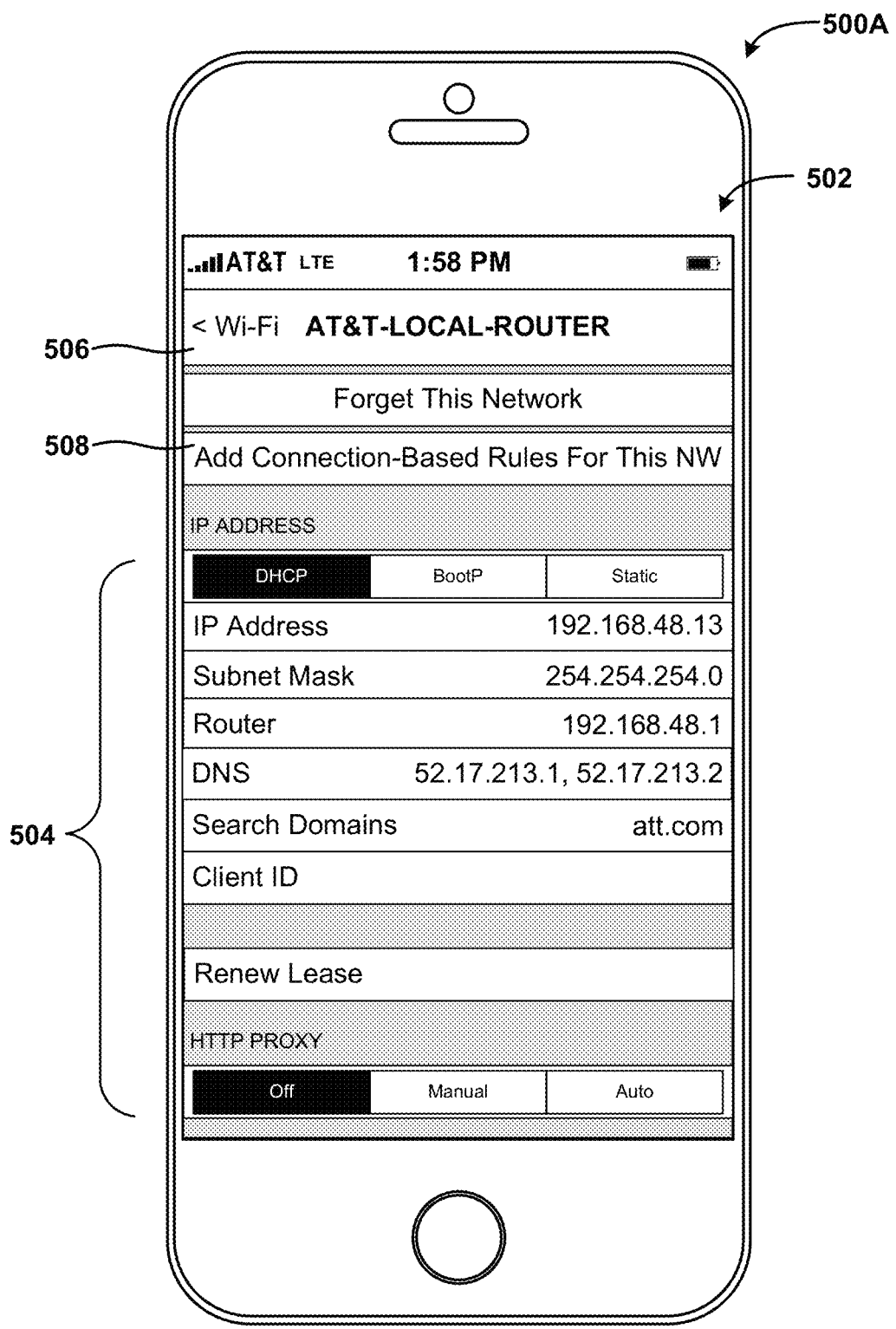
FIGS. 5A-5B are user interface diagrams showing various screen displays for interacting with a connection management application, according to some illustrative embodiments of the concepts and technologies described herein.
Figure 5B:
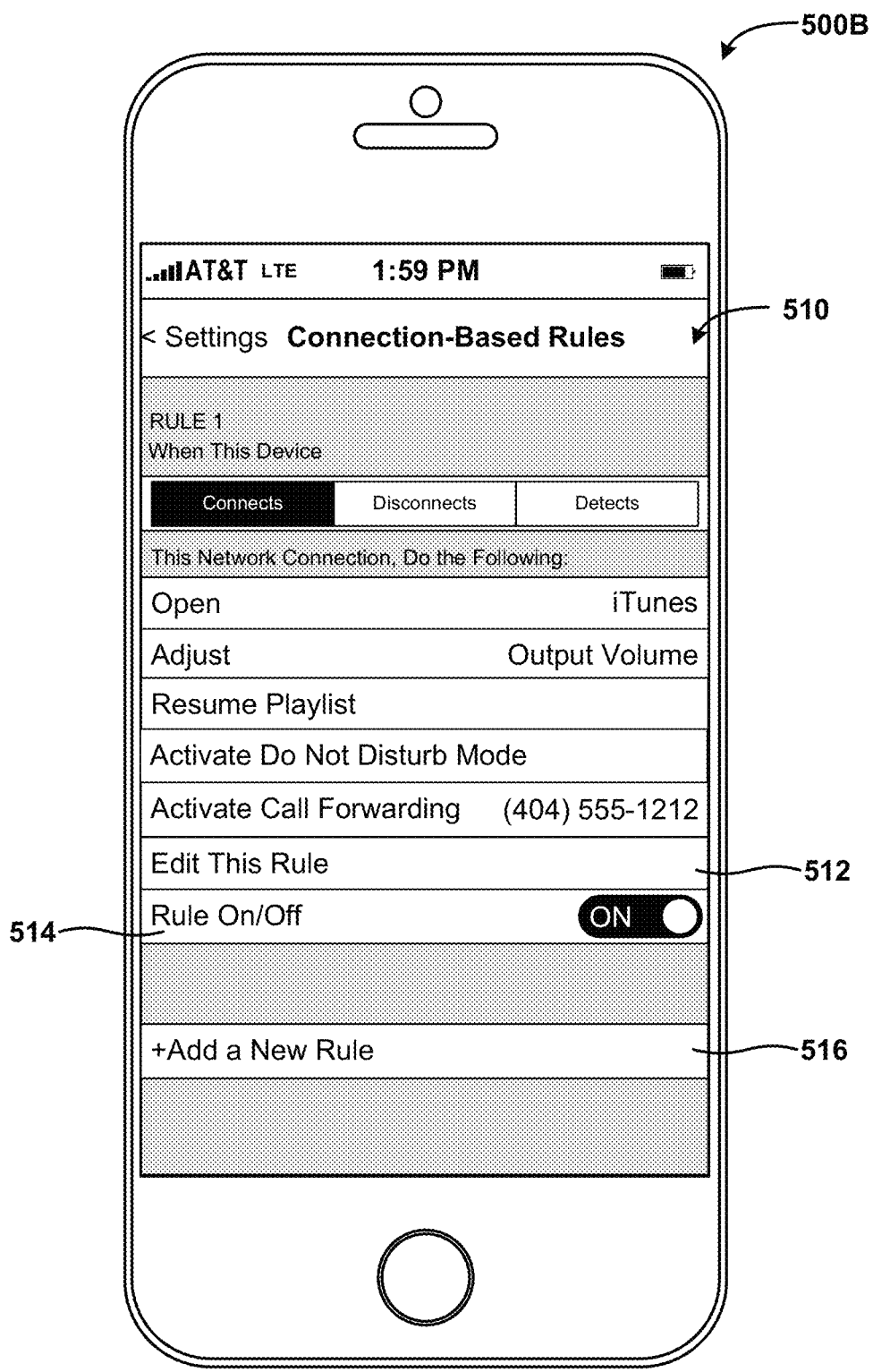

FIGS. 5A-5B are user interface ("UI") diagrams showing aspects of UIs for using and/or interacting with a connection management application 108, according to some illustrative embodiments. FIG. 5A shows an illustrative screen display 500A, which can be generated by a device such as the user device 102 via interactions with the connection management application 108. According to various embodiments, the user device 102 can generate the screen display 500A and/or other screen displays in conjunction with and/or based upon interactions with the connection management application 108 described herein. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, during interactions between a user and the connection management application 108, for example during creation of a rule 110 as illustrated and described above with reference to FIGS. 1-4. The screen display 500A also (or alternatively) can be presented in response to detecting a request to modify a network connection, in response to a request to set preferences and/or settings associated with the connection management application 108, or at other times. Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include a connection configuration screen 502. The connection configuration screen 502 can be configured to allow a user or other entity to control various options associated with the connection management application 108 and/or with one or more network connections associated with the user device 102. The connection configuration screen 502 can include various data and/or information ("connection information") 504 relating to a particular network connection, as generally is understood. The connection information 504 can include options for setting a type of IP address; options for setting HTTP proxy settings, information relating to the IP address, subnet mask, search domains, DNS addresses, and/or the like; and/or other information. In the illustrated embodiment, the network connection can correspond to a connection to the "AT&T LOCAL ROUTER," as indicated by the title bar 506 of the connection configuration screen 502. It should be understood that this example is illustrative and therefore should not be construed as being limiting in any way.

The connection configuration screen 502 also can include a UI option 508 to add connection-based rules that will relate to the network connection depicted in the connection configuration screen 502. Thus, selection of the UI option 508 can cause the user device 102 to present another screen for modifying and/or adding connection-based rules (e.g., the rules 110 illustrated and described herein) for the network connection. It should be understood that this example is illustrative and therefore should not be construed as being limiting in any way. Because additional or alternative controls can be included in the connection configuration screen 502, it should be understood that the example embodiment shown in FIG. 5A is illustrative and therefore should not be construed as being limiting in any way.

Referring now to FIG. 5B, a UI diagram showing additional aspects of some of the concepts and technologies disclosed herein for providing and/or using a connection management application 108 are described in detail. In particular, FIG. 5B shows an illustrative screen display 500B, which can be generated by a device such as the user device 102 via interactions with the connection management application 108. According to various embodiments, the user device 102 can generate the screen display 500B and/or other screen displays in conjunction with and/or based upon interactions with the connection management application 108 described herein (e.g., via rendering web data provided by a web portal exposed by the connection management application 108, or the like). In the illustrated embodiment, the screen display 500B can be presented in response to detecting an interaction with the UI option 508 illustrated and described above with reference to FIG. 5A. Because the screen display 500B can be presented at additional and/or alternative times, it should be appreciated that the UI diagram illustrated in FIG. 5B is illustrative of one contemplated example of the UIs that can be generated and/or displayed in accordance with the concepts and technologies disclosed herein, and therefore should not be construed as being limiting in any way.

The screen display 500B can include a connection-based rule configuration screen 510. It should be understood that the connection-based rule configuration screen 510 shown in FIG. 5B is one contemplated embodiment of a display that can be interacted with by an administrator, customer, user, or other entity to create one or more connection-based rules such as the rules 110 illustrated and described herein. As such, the illustrated embodiment should not be construed as being limiting in any way.

As shown in FIG. 5B, the connection-based rule configuration screen 510 can provide information that defines one or more connection-based rules, as well as providing UI controls to enable editing of the one or more connection-based rules. In the illustrated embodiment, information associated with one rule 110 is illustrated. Because any number of rules 110 can be represented by information included in the connection-based rule configuration screen 510, it should be understood that this example is illustrative and therefore should not be construed as being limiting in any way.

As shown in FIG. 5B, the connection-based rule configuration screen 510 can show, for each rule 110, one or more actions that are to be performed when the user device 102 connects to, disconnects from, and/or detects a particular network or network connection (e.g., the network connection indicated in the title bar 506 of the screen display 500A shown above). In the embodiment illustrated in FIG. 5B, the condition for the rule 110 has been set to detecting connection to a particular network connection, and five different actions have been defined for that rule 110. In particular, the rule 110 is illustrated as specifying that when a connection to the network connection is detected by the user device 102 (and/or the connection management application 108 executed thereby), that the user device 102 should a) open the iTunes application, b) adjust an output volume associated with the user device 102, c) resume playback of playlist associated with the user device 102, d) activate a "do not disturb" mode to prevent calls and/or other communications from interrupting other functions of the user device 102, and/or e) activate a call forwarding feature for the user device 102. Because additional and/or alternative actions are contemplated and are possible, it should be understood that these examples are illustrative and therefore should not be construed as being limiting in any way.

The connection-based rule configuration screen 510 also can include an option 512 to edit the rule 110 being presented by way of the connection-based configuration screen 510, and an option 514 to turn on or off the rule 110 being presented by way of the connection-based rule configuration screen 510. Thus, selection of the option 512 can cause the user device 102 to present another interface that enables editing of the various conditions and/or actions depicted in FIG. 5B and/or enable editing of the conditions and/or actions within the connection-based rule configuration screen 510. Similarly, selection of the option 514 can cause the user device 102 to turn on or off the rule 110 depicted by way of the connection-based rule configuration screen 510. Because the rules 110 can be edited and/or activated/deactivated in additional and/or alternative manners, it should be understood that this example is illustrative and therefore should not be construed as being limiting in any way.

The screen display 500B also is illustrated as including a UI option 516 that, when selected, enables creation of a new rule 110 and/or guides a user or other entity through a process to create the new rule 110 (e.g., to create conditions, actions, and the like). Because additional or alternative controls can be included in the screen display 500B, it should be understood that the example embodiment shown in FIG. 5B is illustrative and therefore should not be construed as being limiting in any way.

Figure 6:
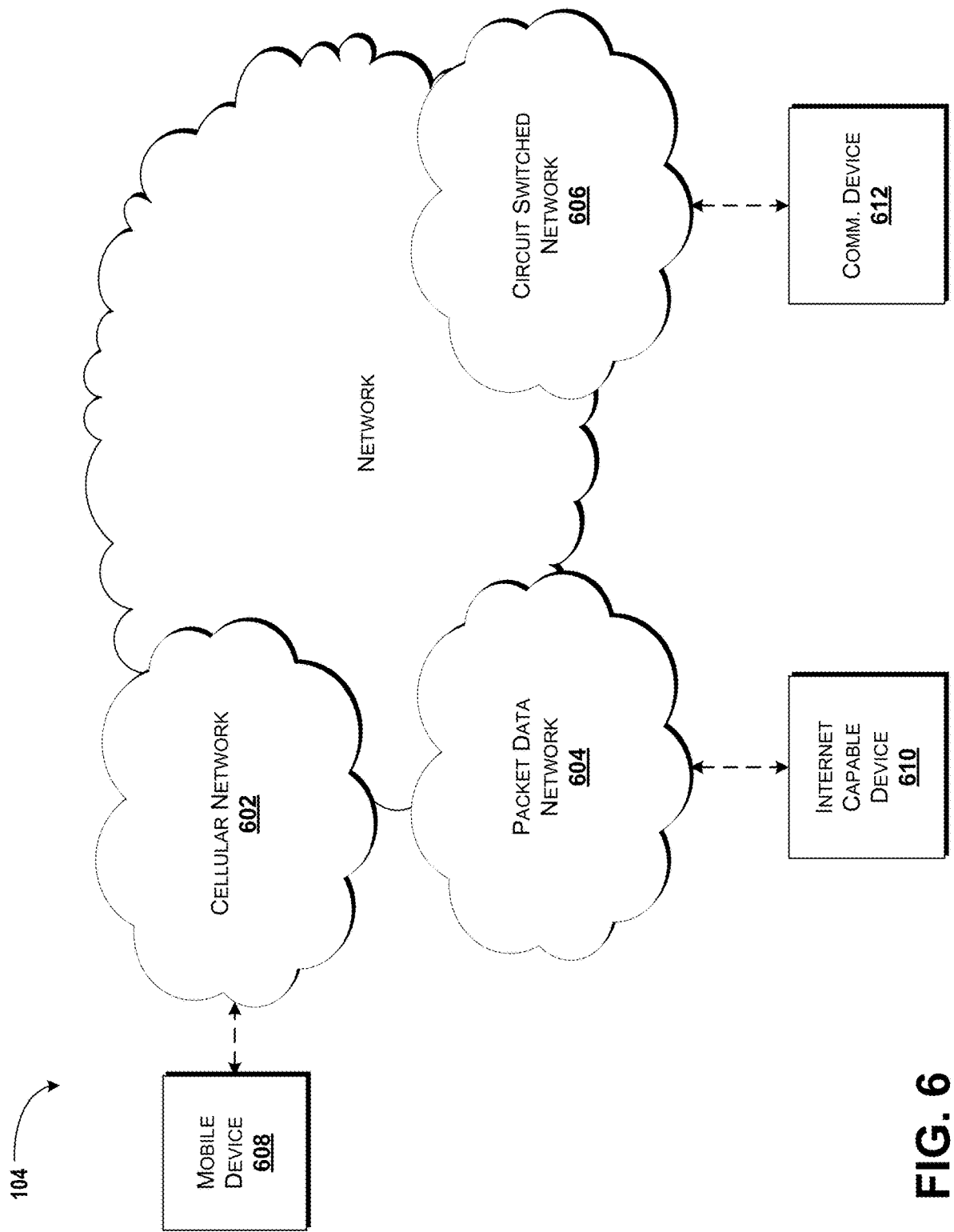
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
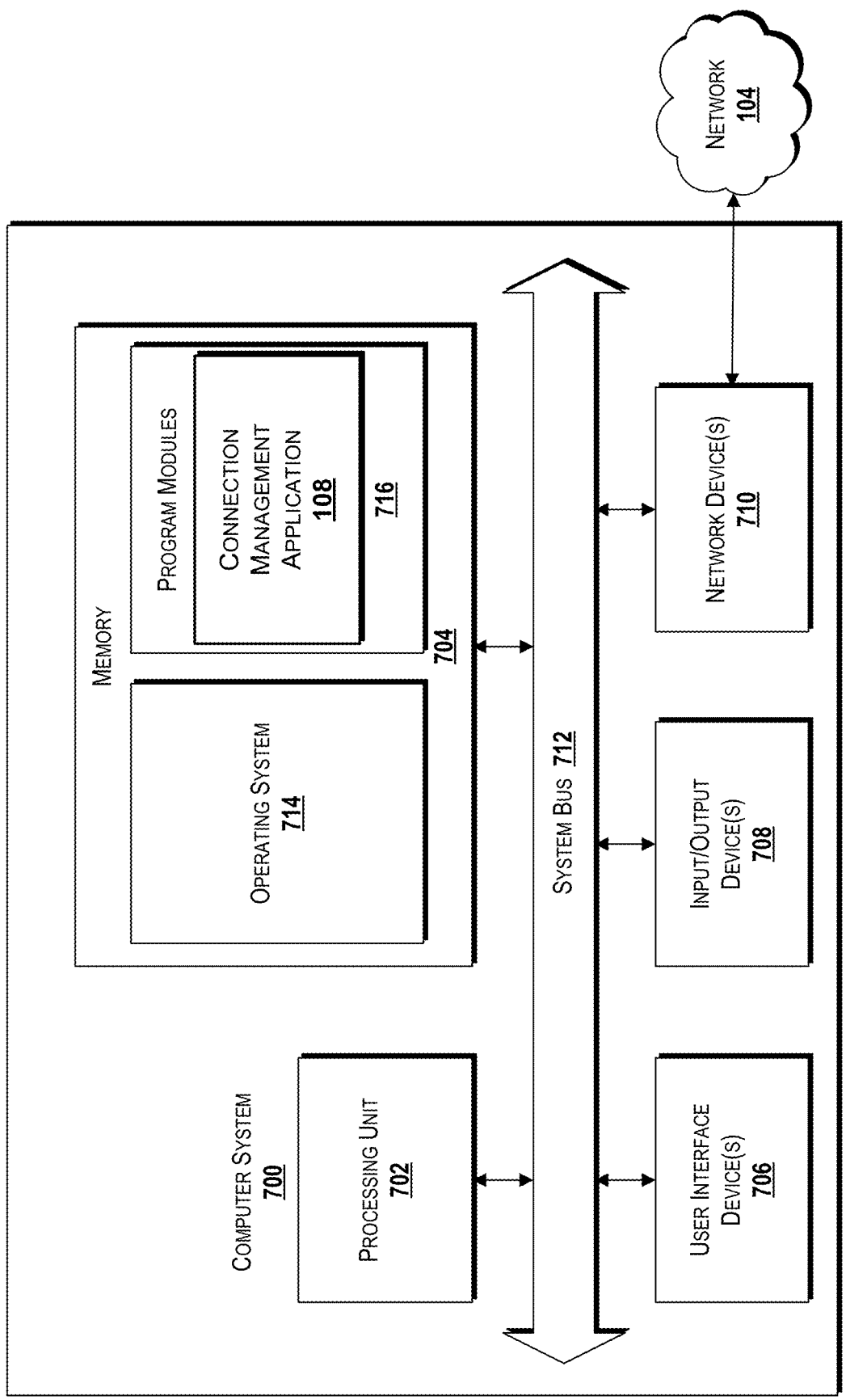
FIG. 7 is a block diagram illustrating an example computer system configured to provide user-defined device connection management, according to some illustrative embodiments of the concepts and technologies described herein.

FIG. 7 is a block diagram illustrating a computer system 700 configured to provide the functionality described herein for user-defined device connection management, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the connection management application 108. This and/or other programs can be embodied in computer-readable media containing instructions that, when executed by the processing unit 702, perform one or more of the methods 200, 300, 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the rules 110 and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
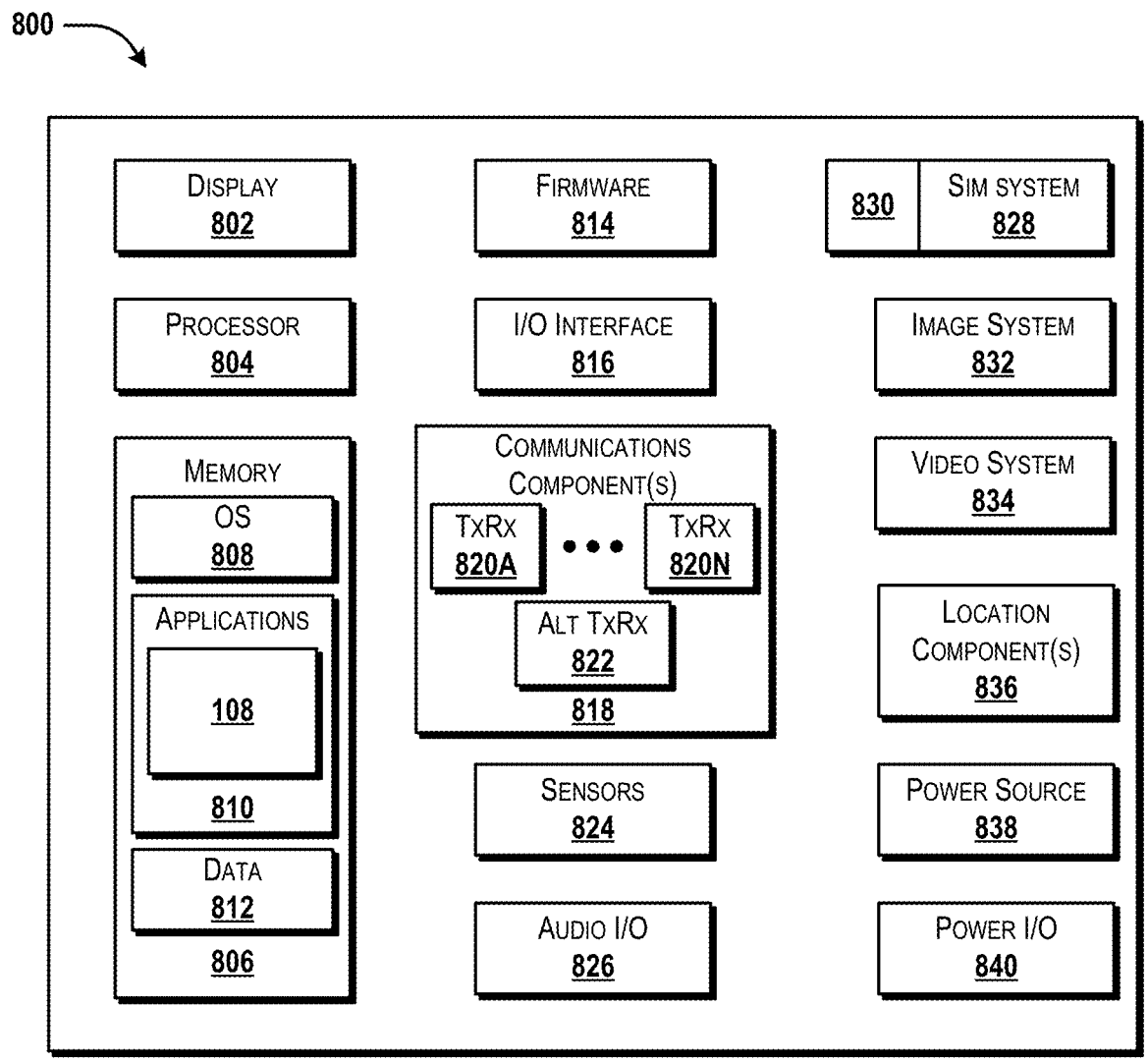
FIG. 8 is a block diagram illustrating an example mobile device configured to provide user-defined connection management, according to some illustrative embodiments of the concepts and technologies described herein.

Turning now to FIG. 8, an illustrative mobile device 800 and components thereof will be described. In some embodiments, the user device 102 described above with reference to FIGS. 1-5B can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements for viewing network connections, connection-based rules, location information, application data, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the connection management application 108, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, creating connection-based rules, viewing network connections, modifying and/or deleting connection-based rules, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the rules 110 and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, connection data, authentication data, connection preferences, location information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for user-defined device connection management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A device comprising a processor, a networking device comprising a first transceiver and a second transceiver, and a memory that stores computer-executable instructions that, when executed by the processor, cause the processor to perform operations comprising:
    defining a connection-based rule that defines a condition and an action to be taken if the condition is detected, wherein the condition comprises detecting establishment of a first connection between the networking device and a first hardware device located at a building at a geographic location, wherein the first connection comprises communications via the first transceiver using a first communication protocol, wherein the action comprises initiating a second connection between the networking device and a second hardware device that is located at the building at the geographic location, and wherein the second connection comprises communications via the second transceiver using a second communication protocol;
    detecting establishment of the first connection between the networking device and the first hardware device; and
    in response to detecting establishment of the first connection,
        pairing with the second hardware device to establish the second connection, wherein pairing with the second hardware device comprises exchanging, with the second hardware device, connection communications to create a peer-to-peer connection with the second hardware device, and
        communicating with the second hardware device via the second connection.

2. The device of claim 1, wherein the second hardware device comprises an audio system.

3. The device of claim 2, wherein the connection-based rule further specifies that in response to detecting the first connection, a preference specifying a volume control for the audio system is to be sent to the audio system via the second connection.

4. The device of claim 1, wherein the second hardware device comprises a home control device, and wherein the connection-based rule further specifies that in response to detecting the first connection, a setting associated with the home control device is to be adjusted via the second connection.

5. The device of claim 1, wherein the connection-based rule further specifies that in response to detecting disconnection from the first hardware device, a further action that relates to the second hardware device is to be performed.

6. The method of claim 1, wherein the connection-based rule further specifies that in response to detecting the first connection, the user device is to activate a do-not-disturb mode for the user device.

7. The computer storage medium of claim 1, wherein the connection-based rule further specifies a further action to be taken in response to detecting activation of an application.

8. The device of claim 1, wherein the connection-based rule further specifies a further action to be taken in response to detecting activation of an application.

9. The device of claim 1, wherein the connection-based rule further specifies adjusting a data rate in response to detecting the first connection.

10. The device of claim 1, wherein the connection-based rule further specifies:
    transmitting preferences that specify settings for the second hardware device to the second hardware device via the second connection, and
    transmitting, via the second connection, session data to the second hardware device.

11. A computer storage medium having computer-executable instructions stored thereon that, when executed by a processor, cause the processor to perform operations comprising:
    defining a connection-based rule that that defines a condition and an action to be taken if the condition is detected, wherein the condition comprises detecting establishment of a first connection between a networking device and a first hardware device that is located at a building at a geographic location, wherein the networking device is part of a user device, wherein the networking device comprises a first transceiver and a second transceiver, wherein the first connection comprises communications via the first transceiver using a first communication protocol, wherein the action comprises initiating a second connection between the networking device and a second hardware device that is located at the building at the geographic location, and wherein the second connection comprises communications via the second transceiver using a second communication protocol;
    detecting establishment of the first connection between the networking device and the first hardware device; and
    in response to detecting establishment of the first connection,
        pairing with the second hardware device to establish the second connection, wherein pairing with the second hardware device comprises exchanging, with the second hardware device, connection communications to create a peer-to-peer connection with the second hardware device, and
        communicating with the second hardware device via the second connection.

12. The computer storage medium of claim 11, wherein the second hardware device comprises an audio system.

13. The computer storage medium of claim 12, wherein the connection-based rule further specifies that in response to detecting the first connection, a preference specifying a volume control for the audio system is to be sent to the audio system via the second connection.

14. The computer storage medium of claim 11, wherein the connection-based rule further specifies that in response to detecting the first connection, an application is to be activated, and wherein the connection-based rule further specifies a further action to be taken when deactivation of the application is detected.

15. The computer storage medium of claim 11, wherein the connection-based rule further specifies a further action to be taken when disconnecting from the first hardware device is detected, wherein the action relates to the second hardware device.

16. A method comprising:
    defining, at a user device that comprises a processor and a networking device that comprises a first transceiver and a second transceiver, a connection-based rule that that defines a condition and an action to be taken if the condition is detected, wherein the condition comprises detecting establishment of a first connection between the networking device and a first hardware device located at a building at a geographic location, wherein the first connection comprises communications via the first transceiver using a first communication protocol, wherein the action comprises initiating a second connection between the networking device and a second hardware device that is located at the building at the geographic location, wherein the second connection comprises communications via the second transceiver using a second communication protocol;
    detecting, by the user device, establishment of the first connection between the networking device and the first hardware device; and
    in response to detecting establishment of the first connection,
        pairing, by the user device, with the second hardware device to establish the second connection, wherein pairing with the second hardware device comprises exchanging, with the second hardware device, connection communications to create a peer-to-peer connection with the second hardware device, and
        communicating, by the user device, with the second hardware device via the second connection.

17. The method of claim 16, wherein the second hardware device comprises an audio system.

18. The method of claim 17, wherein the connection-based rule further specifies that in response to detecting the first connection, a preference specifying a volume control for the audio system is to be sent to the audio system via the second connection.

19. The method of claim 16, wherein the connection-based rule further specifies that in response to detecting the first connection, an application is to be activated at the user device.

20. The method of claim 16, wherein the connection-based rule further specifies a further action to be taken when disconnecting from the first hardware device is detected, and wherein the action relates to the second hardware device.

* * * * *